US008415041B2

(12) United States Patent
Eisenhour

(10) Patent No.: US 8,415,041 B2
(45) Date of Patent: Apr. 9, 2013

(54) VEHICLE BATTERY TEMPERATURE CONTROL SYSTEM FLUIDLY COUPLED TO AN AIR-CONDITIONING REFRIGERATION SYSTEM

(75) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 351 days.

(21) Appl. No.: 12/828,027

(22) Filed: Jun. 30, 2010

(65) Prior Publication Data
US 2012/0003515 A1   Jan. 5, 2012

(51) Int. Cl.
*H01M 10/50* (2006.01)
(52) U.S. Cl. .......................................... 429/62; 429/120
(58) Field of Classification Search ............. 429/62, 429/120
See application file for complete search history.

(56) References Cited

U.S. PATENT DOCUMENTS

| | | | | |
|---|---|---|---|---|
| 4,007,315 | A | * | 2/1977 | Brinkmann et al. ............ 429/62 |
| 4,329,407 | A | | 5/1982 | Gross et al. |
| 5,560,217 | A | * | 10/1996 | Takahashi et al. ............ 62/200 |
| 6,942,944 | B2 | | 9/2005 | Al-Hallaj et al. |
| 2007/0148503 | A1 | | 6/2007 | Okazaki |
| 2009/0246606 | A1 | | 10/2009 | Shimizu |
| 2009/0249802 | A1 | * | 10/2009 | Nemesh et al. ................. 62/56 |
| 2009/0305124 | A1 | | 12/2009 | Ahn et al. |
| 2010/0025125 | A1 | | 2/2010 | Bienert et al. |
| 2011/0262793 | A1 | * | 10/2011 | Reis et al. ..................... 429/120 |

FOREIGN PATENT DOCUMENTS

| | | | |
|---|---|---|---|
| GB | 2295264 A | * | 5/1996 |
| JP | H09-259940 | | 10/1997 |
| JP | H11-040211 | | 2/1999 |
| WO | WO-2009/046269 | | 4/2009 |

OTHER PUBLICATIONS

The International Search Report and the Written Opinion of the International Search Authority for International Application No. PCT/US2011/042337, dated Sep. 21, 2011, mailed Sep. 28, 2011.
Ahmad A. Pesaran, "Battery Thermal Management in EVs and HEVs: Issues and Solutions", Advanced Automotive Battery Conference, Las Vegas NV, Feb. 6-8, 2001.
Uwe Wiedemann et al., "Advanced energy storage systems for Hybrids" published prior to Jun. 30, 2010.
"Traction Battery Systems Thermal Management", Lecture Handout, Wayne State University, MI, published prior to Jun. 30, 2010.

* cited by examiner

*Primary Examiner* — Basia Ridley
*Assistant Examiner* — Sean P Cullen
(74) *Attorney, Agent, or Firm* — Global IP Counselors, LLP

(57) ABSTRACT

A vehicle battery temperature control system includes a battery, a housing, a heat exchanger, a valve and a sensor. The battery has a heat sink that transfers thermal energy. The housing has a chamber that contains the battery and saturated liquid coolant that substantially immerses the heat sink to receive the thermal energy to cause a phase change of the coolant from a liquid to a vapor. The heat exchanger removes thermal energy from the vapor to change the vapor to liquid, and returns the liquid to the chamber. The valve selectively fluidly couples the chamber to an air-conditioning system to enhance cooling of the coolant. The sensor detects a characteristic of the coolant and signals operation of the valve to fluidly couple the chamber to the air-conditioning refrigeration system to increase removal of thermal energy from the coolant based on a relationship between the characteristic of the coolant and a threshold.

20 Claims, 2 Drawing Sheets

VEHICLE BATTERY TEMPERATURE CONTROL SYSTEM FLUIDLY COUPLED TO AN AIR-CONDITIONING REFRIGERATION SYSTEM

BACKGROUND

1. Field of the Invention

The present invention generally relates to vehicle battery temperature control. More specifically, the present invention relates to a vehicle battery temperature control system and method that use liquid phase and vapor phase coolant to maintain desired battery temperature, and add coolant to enhance cooling as necessary.

2. Background Information

A hybrid electric vehicle (HEV) or full electric vehicle relies substantially or completely on battery power for operation. Therefore, it is desirable to maintain the battery cells at an optimal operating temperature. As understood in the art, battery cells are often best suited to operate in a somewhat small optimum temperature range. Consequently, the life or durability of the battery, as well as the performance of the battery, such as the available power provided by the battery, can be adversely affected by temperatures above and below that optimum temperature range. Furthermore, to optimize battery performance, it is essential to maintain temperature uniformity among the cells of a battery, for example, multiple battery cells assembled in a battery module.

Typically, batteries of HEVs or full electric vehicles can be cooled by air, or by a liquid coolant that, for example, has a high water content. However, when cooling fluid is provided by a pumping mechanism, such as a fan or liquid pump, in a single phase (e.g., a liquid phase), temperature gradients will exist along the flow path. That is, because heat is transferred at all points along the flow path, the temperature of the liquid coolant increases from the entrance to the exit of the battery assembly. These gradients can be somewhat reduced by increasing fluid flow rate, which consumes greater energy. Also, shortened parallel flow paths along the cells can be used instead of a serial flow path.

Some systems use the vehicle's air-conditioning (A/C) system refrigerant to cool the battery structure as a primary fluid, or through a secondary fluid which is commonly referred to as a chiller design. Typically, the coldest temperature of the A/C cycle is used to provide the cooling effect. This temperature is generally around 5 degrees Celsius, which is lower than the desired operating temperature range of the battery. Accordingly, a control system is required that, for example, modulates or pulses the flow of cold refrigerant into the battery assembly so as not to overcool the battery. However, this flow modulation can result in the coolant departing from the saturated state, and can create large and detrimental temperature gradients within the battery assembly, thus degrading the battery's life and performance. Furthermore, when the local refrigerant becomes superheated vapor, its temperature will rise due the added heat, thus decreasing the cooling capability. Also, a chiller design will likely have a fluid in the liquid state that will similarly increase in temperature with the added heat.

SUMMARY

It has been discovered that to improve temperature control for a vehicle battery, coolant in liquid and vapor phase can be used, and the coolant can be replenished as necessary.

In view of the state of the known technology, one aspect of the present invention is to provide a vehicle battery temperature control system including a battery, a housing, a heat exchanger, a valve and a sensor. The battery is operable to discharge thermal energy, and has a heat sink configured to transfer the thermal energy from the battery. The housing has a chamber that is configured to receive the battery and contain a saturated liquid coolant that substantially immerses the heat sink so that the coolant receives the thermal energy from operation of the battery to cause a phase change of the coolant from a liquid phase to a vapor phase. The heat exchanger is configured to receive vapor phase coolant from the chamber and remove thermal energy from the vapor phase coolant to change the coolant from the vapor phase to the liquid phase, and is further configured to return the liquid phase coolant to the chamber. The valve is operable to selectively fluidly couple the chamber to an air-conditioning refrigeration system to enhance cooling of the coolant in the chamber. The sensor is operable to detect a characteristic of the coolant and to signal operation of the valve to fluidly couple the chamber to the air-conditioning refrigeration system to increase removal of thermal energy from the coolant based on a relationship between the characteristic of the coolant and a threshold.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
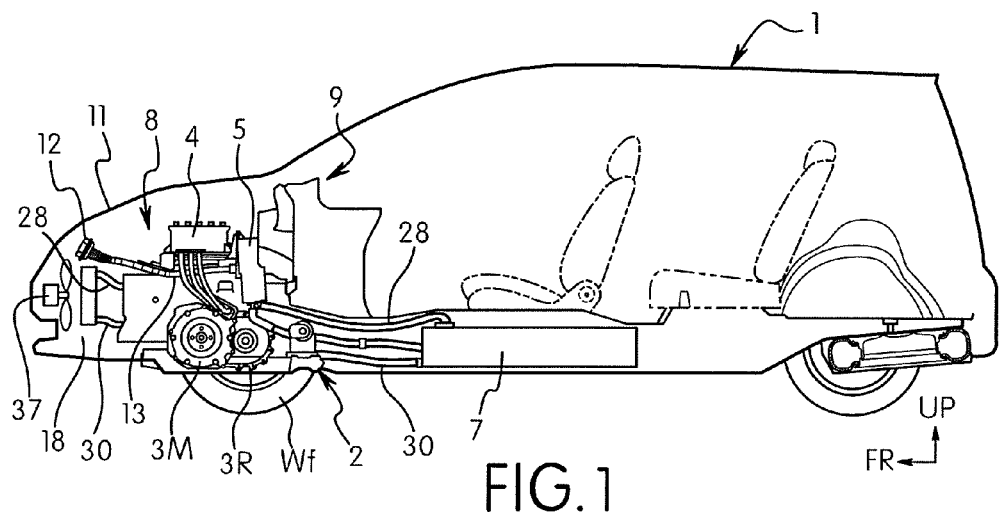
FIG. 1 is an exemplary diagram of an electric vehicle employing a vehicle battery temperature control system in accordance with an illustrated embodiment.
Figure 2:
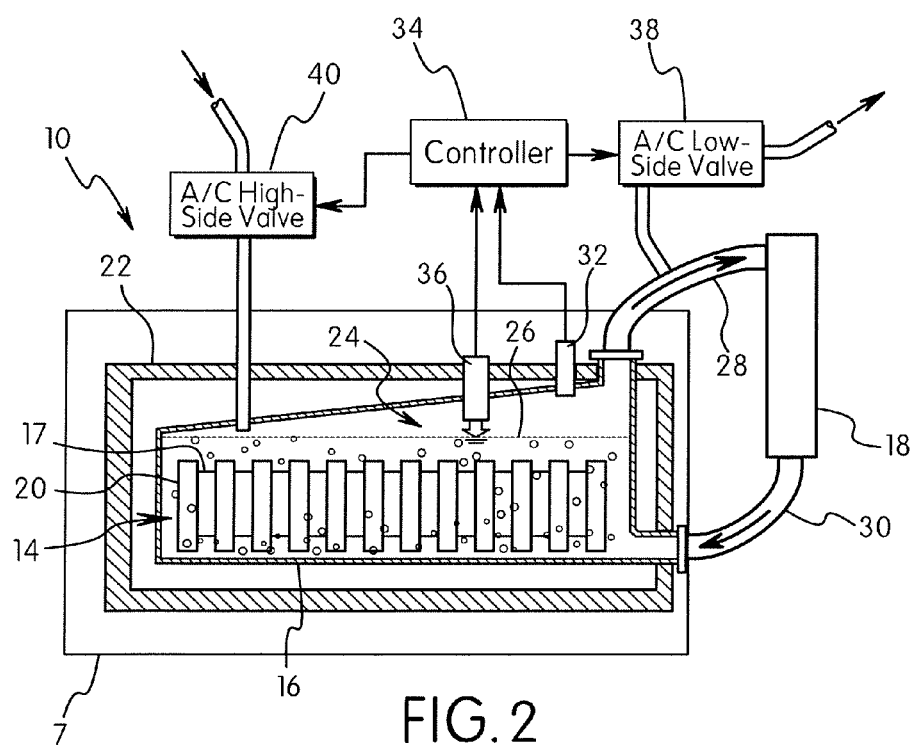
FIG. 2 is a detailed exemplary diagram of the vehicle battery temperature control system employed in the vehicle shown in FIG. 1.

Referring initially to FIGS. 1 and 2, a portion of an electric vehicle 1 is partially illustrated with a vehicle battery temperature control system 10 in accordance with a first embodiment. In the figures, an arrow FR indicates a frontward direction of the vehicle, and an arrow UP indicates an upward direction of the vehicle.

In this embodiment, the vehicle 1 includes a vehicle body 2 that supports a power unit that includes an electric motor 3M and a reduction gear 3R. The electric motor 3M and the reduction gear 3R are configured as a single integrated unit. The electric motor 3M is installed in a front section of the vehicle body 2. The electric motor 3M is operatively coupled to a pair of front wheels Wf in a conventional manner to rotate the front wheels Wf. Thus, the electric motor 3M propels the vehicle 1. In addition to the electric motor 3M, various comparatively heavy electrical components are mounted on the vehicle body 2 In particular, as shown in FIGS. 1 and 2, the vehicle body 2 also supports various comparatively heavy electrical components including, but not limited to, an inverter 4, a circuit box 5, a charger (not shown) and a battery unit 7.

In this embodiment, the electric motor 3M, the inverter 4 and the circuit box 5 are arranged in a frontward portion of the vehicle 1. Meanwhile, the battery unit 7 is arranged in a longitudinally middle portion of the vehicle 1 and the charger (not shown) is arranged in a rearward portion of the vehicle 1. In this way, a plurality of electrical components are arranged to be distributed appropriately in the longitudinal direction of the vehicle 1 such that the weight of the vehicle 1 can be more easily balanced with respect to the longitudinal direction.

As shown in FIG. 1, a front compartment 8 is formed in a frontward portion of the vehicle 1. The front compartment 8 is a space surrounded by a dash panel 9 on a rearward side, a fender panel (not shown) on each of both widthwise sides, and a bumper (not shown) and grill (not shown) on a frontward side. A hood 11 is arranged and configured such that the hood 11 can open and close an upper opening of the front compartment 8. The power unit (the electric motor 3M and the reduction gear 3R), the inverter 4, the circuit box 5, and other components are housed inside the front compartment 8.

While only one charging port 12 is illustrated, typically, two or more charging ports could be provided. A low-voltage charging port would be provided to conduct charging at a comparatively low (household) voltage (e.g., 100V or 200V). A high-voltage charging port would be provided to conduct charging at a comparatively high voltage (e.g., 500 V). The charging harnesses 13 are connected to the charging ports. Low-voltage electric power supplied to the low-voltage charging port from a low-voltage power supply cord is converted to a higher voltage by the charger (which includes a transformer (not shown) for converting a low voltage to a higher voltage) and the higher voltage power is supplied to the battery cells of a battery 14 (FIG. 2) inside the battery unit 7 through the circuit box 5 (conductor portions inside the circuit box 5). High-voltage electric power supplied to the high-voltage charging port from a high-voltage power supply cord is supplied to the battery 14 inside the battery unit 7 through the circuit box 5 (conductor portions inside the circuit box 5). The high-voltage charging port enables charging to be completed at a faster rate. In addition to the transformer, the charger is also provided with additional electrical components such components as a rectifier circuit for converting alternating current to direct current and a filter.

As shown in more detail in FIG. 2, in addition to the battery 14, the vehicle battery temperature control system 10 also includes a housing 16 and a heat exchanger 18. The battery 14 includes a plurality of stacked battery cells 17 and a heat sink 20 that can be configured as a single heat sink or a plurality of heat sinks, and can have any suitable heat exchange features as understood in the art. During operation, the battery 14 becomes heated and thus discharges thermal energy. The heat sink 20 can transfer the thermal energy generated by the battery 14 away from the battery 14, or can transfer thermal energy to the battery 14.

Figure 3:
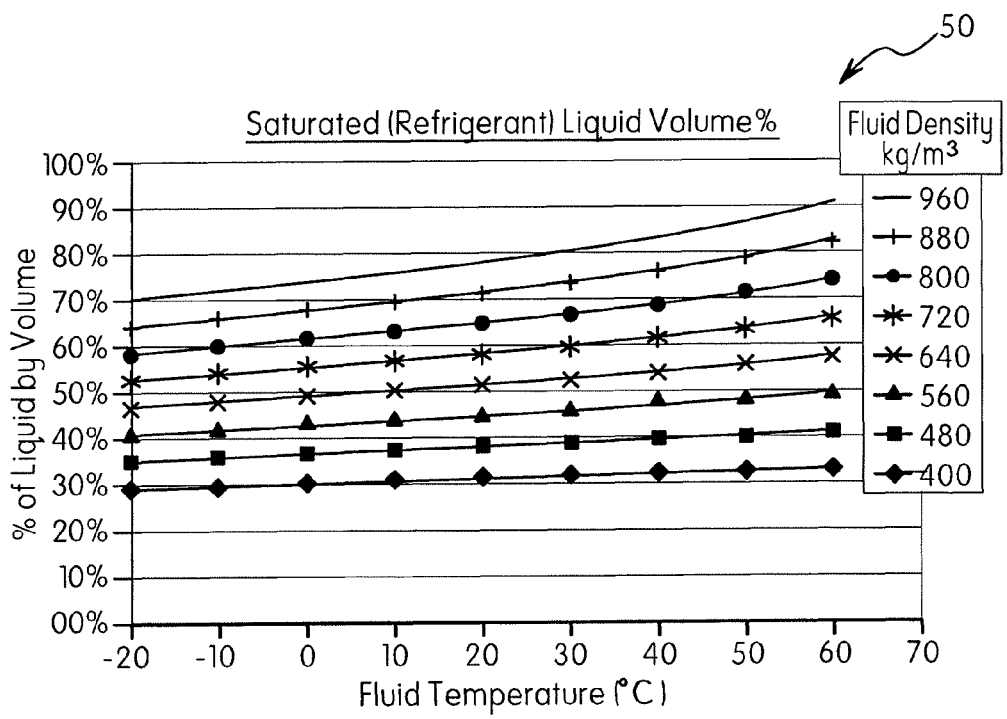
FIG. 3 is a graph illustrating an exemplary relationship between the percentage of coolant liquid by volume versus the coolant liquid temperature in the system of FIG. 2.

The housing 16 includes an insulation member 22 configured to substantially enclose the housing 16. As illustrated, the battery 14 and heat sink 20, housing 16, insulation member 22 and associated components described herein are included in the battery unit 7 shown in FIG. 1. The housing 16 defines a chamber 24 that is configured to receive the battery 14 and contain a saturated liquid coolant 26 that substantially immerses the heat sink 20 so that the coolant receives the thermal energy from operation of the battery 14 to cause a phase change of the coolant from a liquid phase to a vapor phase. In this example, the coolant 26 includes 1,1,1,2-Tetrafluoroethane (known as R-134a) or 2,3,3,3-Tetrafluoroprop-1-ene (known as HFO-1234yf). However, the coolant 26 can include any suitable type of liquid or refrigerant. Furthermore, the chamber 24 can be configured such that the saturated liquid coolant 26 in the chamber 24 completely immerses the heat sink 20. As shown in graph 50 of FIG. 3, the liquid volume of common types of refrigerants are reasonably stable across the expected ambient temperature range.

The heat exchanger 18 is configured in an elevated position with respect to the chamber 24 to receive vapor phase coolant from the chamber 24 and remove thermal energy from the vapor phase coolant to change the coolant from the vapor phase to the liquid phase. In this example, the heat exchanger 18 is positioned substantially above a level of the saturated liquid coolant in the chamber 24, and receives the vapor phase coolant from the chamber 24 via a conduit 28 that can be a tube made of rubber, metal or any other suitable material. The heat exchanger 18 is further configured to return the liquid phase coolant to the chamber 24 via a conduit 30 that can be a tube made of rubber, metal or any other suitable material. In one configuration, the heat exchanger 18 includes a condenser that is fluidly coupled to receive the vapor phase coolant from the chamber 24 via conduit 28. The condenser is operable to remove heat from the vapor phase coolant to create the liquid phase coolant, and is fluidly coupled to return the liquid phase coolant to the chamber 24 via conduit 30.

It should be noted that the insulation member 22 ensures that the management of the temperature in the chamber 24 is principally controlled at the heat exchanger 18 (condenser). This is particularly beneficial when, for example, the battery 14 is a cold battery pack operating in a low ambient temperature condition. By limiting heat transfer or adding heat, for example, through warm airflow from the passenger cabin to the condenser, the self heating of the battery 14 can be used to reach the optimum operating temperature range.

As further shown in FIG. 2, the system 10 includes a sensor 32, a controller 34, a sensor 36, a valve 38 and a valve 40. The sensors 32 and 36, controller 34, and valves 38 and 40 are conventional components that are well known in the art. Since these components are well known in the art, these structures will not be discussed or illustrated in significant detail herein. Rather, it will be apparent to those skilled in the art from this disclosure that the components can be any type of structure and/or programming that can be used to carry out the present invention.

The controller 34 can be any suitable type of computer, microprocessor or control device as known in the art. The controller 34 preferably includes a microcomputer with a control program that controls the operations as discussed below. The controller 34 can also include other conventional components such as an input interface circuit, an output interface circuit, and storage devices such as a ROM (Read Only Memory) device and a RAM (Random Access Memory) device. A memory circuit (not shown) stores processing results and control programs such as ones for the operations discussed herein. It will be apparent to those skilled in the art from this disclosure that the precise structure and algorithms for the controller 34 can be any combination of hardware and software that will carry out the functions of the present invention.

As discussed in more detail below, valves 38 and 40 are each operable to selectively fluidly couple the chamber 24 to an air-conditioning (A/C) refrigeration system (not shown) to enhance cooling of the coolant 26 in the chamber 24. In other words, because the coolant 26 and the coolant in the A/C system are identical or similar enough to be compatible with each other, the operation of the compressors in the A/C system can pump coolant into the chamber 24 to replenish the coolant 26 in the chamber 24, and can pump coolant out of the chamber 24 to reduce the temperature and pressure in the chamber 24.

Specifically, the valve 38 in this example is a vapor collection valve operable to receive the vapor phase coolant from the chamber 24 and is coupled to a low pressure side of the A/C refrigeration system. The valve 40 in this example is a return valve configured to provide the liquid phase coolant from a high pressure side of the air-conditioning refrigeration system to the chamber 24 in the housing 16.

Also, sensors 32 and 36 are each operable to detect a characteristic of the coolant 26 and to signal operation of a respective valve 38 or 40 to fluidly couple the chamber 24 to the air-conditioning refrigeration system to increase removal of thermal energy from the coolant 26 when the characteristic of the coolant 26 is above or below a respective threshold. That is, the controller 34 receives the signals from the sensors 32 and 36 and operates the appropriate valve 38 and/or 40 to fluidly couple the chamber 24 to the air-conditioning refrigeration system when the sensor 32 and/or 36 senses that the characteristic of the coolant 26 is above or below the respective thresholds.

Figure 4:
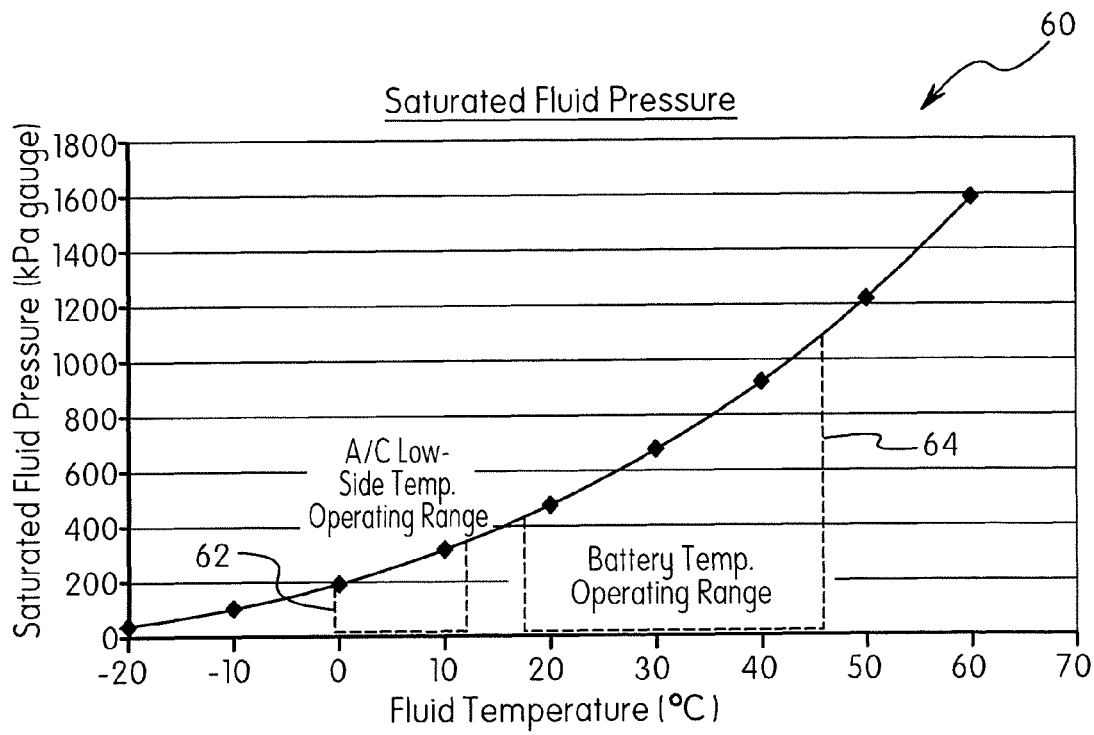
FIG. 4 is a graph illustrating an exemplary relationship between the saturated coolant pressure and the coolant liquid and vapor temperature in the system of FIG. 2.

Specifically, the sensor 32 is operable to detect when the characteristic, which represents a characteristic of the vapor phase coolant, is above the threshold, and is operable to signal the operation of the valve 38 to increase the removal of thermal energy when the characteristic is above the threshold. The sensor 32 includes, for example, a temperature sensor operable to sense a temperature of the coolant 26 as the characteristic. An example of the relationship of the pressure versus the liquid coolant temperature is shown in graph 60 of FIG. 4, with the A/C low side temperature operating range being identified by area 62, and the optimum battery temperature range being identified by area 64. Hence, the threshold can be an upper temperature threshold, such as a temperature threshold at or about 45 degrees Celsius.

Alternatively, or in addition, the sensor 32 includes a pressure sensor operable to sense a pressure in the chamber 24 as the characteristic. In this event, the threshold can be an upper pressure threshold, such as pressure at or about 1100 kPa (see FIG. 4). Naturally, any suitable temperature threshold or pressure threshold can be used. On the other hand, the sensor 36 includes a liquid level sensor configured to detect a level of the liquid phase coolant in the chamber 24 of the housing 16 as the characteristic, and to signal the operation of the valve 40 when the level is sensed as being below the desired threshold level.

Concerning the operation of the system 10, it is understood in the art that when a fluid, such as coolant 26, is contained in a saturated state, coolant in the liquid phase and in the vapor phase coexist at a specific temperature and pressure within the chamber 24. When heat (thermal energy) is added due to, for example, heating of the battery 14 during operation of the battery 14, temperature uniformity is maintained by the fluid vaporizing at the same or substantially the same pressure. This temperature stability and uniformity maintains the cells of the battery 14 at the same or substantially the same temperature within the battery 14.

Moreover, since the phase change from a low energy content liquid phase to a high energy content vapor phase results in a density change, vapor bubbles are separated from the liquid by gravity. That is, vapor bubbles rise to the upper part of the chamber 24. Accordingly, the vapor phase coolant can flow via the conduit 28 into the heat exchanger 18, and is thus transported away from the heat source (i.e., the battery 14) without a pumping mechanism. Moreover, the formation of bubbles absorbs considerable energy without causing a rise in temperature of the coolant 26, and the mixing action of the bubbles in moving toward the free surface of the coolant 26 toward the upper part of the chamber 24 further enhances the temperature uniformity in the battery 14.

Also, since the liquid phase coolant 26 is in a saturated state, temperature uniformity is maintained throughout the battery 14, and the change from the liquid phase to the vapor phase is used to quickly and naturally transport high energy content vapor phase coolant 26 to the heat exchanger 18, due to the vapor density of the vapor phase coolant 26 being much less than that of the surrounding liquid phase coolant 26. This action further enhances the convective heat transfer within the battery 14.

Accordingly, the heat transfer from the vapor phase coolant to the environment external of the system 10 can be managed with the condensing heat exchanger (condenser) 18, with the assistance of a fan 37 (FIG. 1) as needed. However, as discussed below, the operation of the valves 38 and 40 to couple to the A/C system to perform cooling can render the fan unnecessary. The reformation of liquid phase coolant from the vapor phase coolant by the heat exchanger 18 thus maintains the target pressure and corresponding target temperature of the coolant 26, which results in a stable temperature environment for the battery cell heat sink structure. The system 10 is inherently isothermal and does not require forced fluid flow within the battery 14 to perform the required heat exchange functions. Rather, the system 10 allows for the natural flow of high energy vapor phase coolant to the heat exchanger 18 as discussed above, instead of requiring, for example, a pump to force the flow of coolant to a heat exchanger.

However, when the transfer of thermal energy by the heat exchanger 18, and thus the condensing, is insufficient, the sensor 32 will detect that the temperature and/or pressure in the chamber 24 are above their respective thresholds. Accordingly, the sensor 32 will signal the controller 34 to open the valve 38 to access the low side of the A/C system to drop the pressure in the chamber 24. In other words, the opening of the valve 38 allows the vapor phase coolant in the chamber 24 to "boil off" into the low side of the A/C system. This reduction in pressure in the chamber 24 causes a reduction in temperature of the coolant 26, and thus provides a rapid cooling effect. That is, since the coolant 26 is in a saturated state, changes in the pressure in the chamber 24 with result in a phase change that will absorb the heat of vaporization of the coolant 26. Once the sensor 32 senses that the temperature and/or pressure has decreased to below the prescribed threshold, the sensor 32 signals the controller 34 to close the valve 38.

In addition, when the sensor 36 determines that the level of the coolant 26 in the chamber 24 has receded to below a prescribed threshold level due to, for example, the boiling off of coolant 26 into the low side of the A/C system as discussed above, the sensor 36 signals to the controller 34 to open the valve 40. This prescribed threshold level can be a level sufficient to entirely or substantially submerge the heat sink 20, or any desired level. When the valve 40 is opened, the compressor of the A/C system can move coolant from the high side of the A/C cycle into the chamber 24 to replenish the coolant level.

In particular, the refrigerant that is used to replenish the coolant level in the chamber 24 is provided from the post-condenser high pressure portion of the A/C cycle. Hence, the refrigerant is, by design, almost entirely liquid that is hotter than the ambient temperature. When the refrigerant is throttled through valve 40 to replenish the chamber 24, some of the liquid will turn to vapor and achieve the internal saturated temperature/pressure relationship. Thus, liquid is added to the pool within the system 10. The sensor 36 is used to manage this liquid quantity, in order keep the heat sink 20 submerged or, in other words, covered by the liquid coolant.

Furthermore, the access to the low pressure side of the A/C cycle ideally is brief, and removal of vapor coolant occurs quickly through valve 38 and can be modulated by the controller 34, to keep the saturation temperature no colder than the target operating temperature range (e.g., no colder than about 18 degrees Celsius). Once the sensor 36 senses that the level of the coolant 26 has reached the prescribed threshold level, the sensor 36 signals to the controller 24 to close the valve 40. Also, in an extreme case, such as the onset of battery thermal runaway, which is the concurrent escalation of current and temperature that could lead to destruction of the battery 14, the above features might be used to over-cool the batteries to save the battery 14 from destruction.

As can be further appreciated from the above, the system 10 does not generally require a forced flow of coolant 26 by, for example, a pump to enable the heat exchanger 18 to perform the normal heat exchange functions to maintain the temperature and pressure in the chamber 24 within the ranges for optimum battery operation. However, even if the valves 38 and/or 40 are operated to access the cooling power of the A/C system, the system 10 maintains a reserve of liquid coolant in the A/C system and further maintains an isothermal condition in the system 10. Hence, the A/C system can be used to achieve rapid cooling, which may be important in extreme situations, while still maintaining the isothermal condition in the system 10.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), directional terms such as "frontward", "upward" and "above," as well as any other similar directional terms refer to those directions of a vehicle. Accordingly, these terms, as utilized to describe the present invention should be interpreted relative to a vehicle equipped with the vehicle battery temperature control systems described herein.

The terms "detect" or "sense," and their variations, as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle battery temperature control system comprising:
    a battery operable to discharge thermal energy, the battery having a heat sink configured to transfer the thermal energy therefrom;
    a housing having a chamber formed therein that is configured to receive the battery and contain a saturated liquid coolant that at least partially immerses the heat sink so that the coolant receives the thermal energy from operation of the battery to cause a phase change of the coolant from a liquid phase to a vapor phase;
    a heat exchanger configured to receive vapor phase coolant from the chamber and remove thermal energy from the vapor phase coolant to change the coolant from the vapor phase to the liquid phase, and being further configured to return the liquid phase coolant to the chamber;
    a valve operable to selectively fluidly couple the chamber to an air-conditioning refrigeration system to enhance cooling of the coolant in the chamber; and
    a sensor operable to detect a characteristic of the coolant and to signal operation of the valve to fluidly couple the chamber to the air-conditioning refrigeration system to increase removal of thermal energy from the coolant based on a relationship between the characteristic of the coolant and a threshold.

2. The vehicle battery temperature control system according to claim 1, wherein
    the valve is a vapor collection valve operable to receive the vapor phase coolant from the chamber and coupled to a low pressure side of the air-conditioning refrigeration system having a pressure less than that of a high pressure side of the air-conditioning refrigeration system.

3. The vehicle battery temperature control system according to claim 1, wherein
    the valve is a return valve configured to provide the liquid phase coolant from a high pressure side of the air-conditioning refrigeration system to the housing, the high pressure side having a pressure greater than that of a low pressure side of the air-conditioning refrigeration system.

4. The vehicle battery temperature control system according to claim 3, wherein
    the sensor includes a liquid level sensor configured to detect a level of the liquid phase coolant in the housing as the characteristic, and to signal the operation of the valve when the level is sensed as being below the threshold.

5. The vehicle battery temperature control system according to claim 1, further comprising
a controller configured to operate the valve to fluidly couple the chamber to the air-conditioning refrigeration system when the sensor senses that the characteristic of the coolant is above the threshold.

6. The vehicle battery temperature control system according to claim 1, wherein
the sensor is operable to detect when the characteristic, which represents a characteristic of the vapor phase coolant, is above the threshold, and is operable to signal the operation of the valve to increase the removal of thermal energy when the characteristic is above the threshold.

7. The vehicle, battery temperature control system according to claim 6, wherein
the sensor includes a temperature sensor operable to sense a temperature of the coolant as the characteristic.

8. The vehicle battery temperature control system according to claim 6, wherein
the sensor includes a pressure sensor operable to sense a pressure in the chamber as the characteristic.

9. The vehicle battery temperature control system according to claim 1, further comprising
an insulation member configured to enclose the housing.

10. The vehicle battery temperature control system according to claim 1, wherein
the chamber is configured such that the saturated liquid coolant in the chamber completely immerses the heat sink.

11. The vehicle battery temperature control system according to claim 1, wherein
the heat exchanger is positioned above a level of the saturated liquid coolant in the chamber.

12. The vehicle battery temperature control system according to claim 1, wherein
the heat exchanger includes a condenser fluidly coupled to receive the vapor phase coolant, the condenser being operable to remove heat from the vapor phase coolant to create the liquid phase coolant, and being fluidly coupled to return the liquid phase coolant to the chamber.

13. The vehicle battery temperature control system according to claim 1, wherein
the saturated liquid coolant includes one of 1,1,1,2-Tetrafluoroethane and 2,3,3,3-Tetrafluoroprop-1-ene.

14. A vehicle battery temperature control method comprising:

operating a battery having a heat sink and disposed in a chamber of a housing containing a saturated liquid coolant into which the battery is immersed, so that the heat sink transfers thermal energy from the battery to the coolant to cause a phase change of the coolant from a liquid phase to a vapor phase;
operating a heat exchanger to receive vapor phase coolant from the chamber and remove thermal energy from the vapor phase coolant to change the coolant from the vapor phase to the liquid phase;
operating the heat exchanger to return the liquid phase coolant to the chamber;
detecting whether a characteristic of the coolant is above a threshold; and
fluidly coupling the chamber to an air-conditioning refrigeration system to increase removal of thermal energy from the coolant based on a relationship between the characteristic of the coolant and a threshold.

15. The vehicle battery temperature control method according to claim 14, wherein
the fluidly coupling includes providing the vapor phase coolant from the chamber to a low pressure side of the air-conditioning refrigeration system having a pressure less than that of a high pressure side of the air-conditioning refrigeration system.

16. The vehicle battery temperature control method according to claim 14, wherein
the fluidly coupling includes providing the liquid phase coolant from a high pressure side of the air-conditioning refrigeration system to the housing, the high pressure side having a pressure greater than that of a low pressure side of the air-conditioning refrigeration system.

17. The vehicle battery temperature control method according to claim 16, wherein
the detecting includes detecting a level of the liquid phase coolant in the housing as the characteristic; and
the fluidly coupling is performed when the level is detected as being below the threshold.

18. The vehicle battery temperature control method according to claim 14, wherein
the detecting includes detecting when the characteristic, which represents a characteristic of the vapor phase coolant, is above the threshold.

19. The vehicle battery temperature control method according to claim 14, wherein
the detecting includes detecting a temperature of the coolant as the characteristic.

20. The vehicle battery temperature control method according to claim 14, wherein
the detecting includes detecting a pressure in the chamber as the characteristic.

* * * * *